US011309155B2

(12) United States Patent
Song

(10) Patent No.: US 11,309,155 B2
(45) Date of Patent: Apr. 19, 2022

(54) MOLDED CASE CIRCUIT BREAKER

(71) Applicant: LSIS CO., LTD., Anyang-si (KR)

(72) Inventor: Suyang Song, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 313 days.

(21) Appl. No.: 16/539,621

(22) Filed: Aug. 13, 2019

(65) Prior Publication Data
US 2020/0075283 A1 Mar. 5, 2020

(30) Foreign Application Priority Data

Aug. 29, 2018 (KR) .................. 10-2018-0102205

(51) Int. Cl.
H01H 1/20 (2006.01)
H01H 11/00 (2006.01)
(Continued)

(52) U.S. Cl.
CPC .... *H01H 71/0207* (2013.01); *H01H 11/0062* (2013.01); *H01H 33/596* (2013.01);
(Continued)

(58) Field of Classification Search
CPC .... H01H 71/0207; H01H 71/08; H01H 71/52; H01H 71/0214; H01H 71/0257; H01H 11/0062; H01H 33/596; H01H 69/01; H01H 73/02; H01H 73/08; H01H 73/20; H01H 33/025; H02B 1/20
(Continued)

(56) References Cited

U.S. PATENT DOCUMENTS 5,241,289 A * 8/1993 Markowski ............ H01H 9/342
335/201
6,512,192 B1 * 1/2003 Yee ........................ H01H 9/342
218/157
(Continued)

FOREIGN PATENT DOCUMENTS

CN 202196725 U 4/2012
CN 102800540 A 11/2012
(Continued)

OTHER PUBLICATIONS

JP2009158271 translation (Original document published Jul. 16, 2009) (Year: 2009).*
(Continued)

*Primary Examiner* — William A Bolton
(74) *Attorney, Agent, or Firm* — K&L Gates LLP

(57) ABSTRACT

The present disclosure relates to a molded case circuit breaker, and particularly, to a molded case circuit breaker having an enhanced arc protecting function. The molded case circuit breaker includes: a power side terminal portion provided at a front side of an enclosure and having a fixed contact arm; a finger assembly coupled to the fixed contact arm, and disposed on a front surface of the power side terminal portion; and a base bus supporter coupled to an upper surface and a lower surface of the power side terminal portion, and having a finger hole through which the finger assembly is exposed. The base bus supporter is provided with a protection unit configured to enclose the finger assembly around the finger hole.

8 Claims, 7 Drawing Sheets

(51) Int. Cl.
  *H01H 33/59* (2006.01)
  *H01H 69/01* (2006.01)
  *H01H 71/02* (2006.01)
  *H01H 71/08* (2006.01)
  *H01H 71/52* (2006.01)
  *H02B 1/20* (2006.01)

(52) U.S. Cl.
  CPC ............ *H01H 69/01* (2013.01); *H01H 71/08* (2013.01); *H01H 71/52* (2013.01); *H02B 1/20* (2013.01)

(58) Field of Classification Search
  USPC .......... 335/6, 156, 202, 278, 201; 200/51 R, 200/293
  See application file for complete search history.

(56) References Cited

U.S. PATENT DOCUMENTS

| | | | |
|---|---|---|---|
| 6,601,596 B2 | 8/2003 | Liang et al. | |
| 6,822,178 B1 | 11/2004 | Billings et al. | |
| 7,876,192 B2 * | 1/2011 | Bausch | H01H 71/0228 337/13 |
| 8,169,283 B2 * | 5/2012 | Siebels | H01H 71/0228 335/202 |
| 8,698,023 B2 * | 4/2014 | Grunwald | H01H 71/08 200/304 |
| 8,859,918 B2 * | 10/2014 | Sisley | H01R 13/641 200/293 |
| 9,741,500 B1 * | 8/2017 | Seo | H01H 71/08 |
| 9,847,200 B1 | 12/2017 | Park | |

FOREIGN PATENT DOCUMENTS

| | | |
|---|---|---|
| CN | 104025229 A | 9/2014 |
| CN | 206040559 U | 3/2017 |
| CN | 108155070 A | 6/2018 |
| EP | 3330993 A1 | 6/2018 |
| JP | 3414243 B2 | 6/2003 |
| JP | 2007-533083 | 11/2007 |
| JP | 2009099405 A | 5/2009 |
| JP | 2009158271 A | 7/2009 |
| JP | 2013152847 A | 8/2013 |
| KR | 101853859 B1 | 6/2018 |

OTHER PUBLICATIONS

JP Office Action 2019-148880, dated Sep. 18, 2020 (4 pages).
Korean Office Action for related Korean Application No. 10-2018-0102205; action dated Jun. 26, 2019; (4 pages).
European Search Report for related European Application No. 19191865.5; action dated Dec. 12, 2019; (10 pages).
Chinese Office Action for related Chinese Application No. 201910778077.4; action dated May 8, 2021; (7 pages).
Notice of Allowance for related European Application No. 19191865.5; action dated Nov. 23, 2021; (6 pages).

* cited by examiner

MOLDED CASE CIRCUIT BREAKER

CROSS-REFERENCE TO RELATED APPLICATION

Pursuant to 35 U.S.C. § 119(a), this application claims the benefit of earlier filing date and right of priority to Korean Application No. 10-2018-0102205, filed on Aug. 29, 2018, the contents of which is incorporated by reference herein in its entirety.

BACKGROUND OF THE INVENTION

1. Field of the Invention

The present disclosure relates to a molded case circuit breaker, and particularly, to a molded case circuit breaker having an enhanced arc protecting function.

2. Background of the Invention

Generally, a Molded Case Circuit Breaker (MCCB) is an electric device for protecting a circuit and a load by automatically interrupting the circuit when an overload state or a short circuit occurs.

Among such molded case circuit breakers, a plug-in molded case circuit breaker is connected to main busbars of a distribution board.

FIGS. 1 to 3 show the conventional plug-in molded case circuit breaker. FIG. 1 is a perspective view showing that the conventional molded case circuit breaker is installed at a distribution board. FIG. 2 is a side sectional view of a front side of the molded case circuit breaker of FIG. 1. And FIG. 3 is a perspective view of a base bus supporter of the molded case circuit breaker of FIG. 1.

In the molded case circuit breaker 1, a power side terminal portion 1a is connected to busbars 2, and a load side terminal portion 1b is coupled to a distribution board panel 4 by a mounting bracket 3. In case of a three-phase circuit, the busbars 2 are formed in parallel in three. The busbars 2 are installed at one side of the distribution board panel 4 by a busbar mounting member 2a formed of an insulating material.

A fixed contact arm 5 is installed in the molded case circuit breaker 1, and a connector 6 and a finger assembly 7 each for connecting the fixed contact arm 5 to the busbars 2 are provided at the power side terminal portion 1a. Under this configuration, a current flows to the fixed contact arm 5 from the busbars 2, via the finger assembly 7 and the connector 6. In a current flowing state, i.e., if a handle 8 is rotated to an 'On' position, a movable contact arm (not shown) is connected to the fixed contact arm 5, and thus a current flows on a circuit.

The finger assembly 7 is formed to have a predetermined voltage, and is engaged with the busbars 2.

The connector 6 is formed in an shape approximately. An upper end of the connector 6 is connected to the finger assembly 7, and a lower end thereof is connected to the fixed contact arm 5.

A base bus supporter 9 is provided at the power side terminal portion 1a of the molded case circuit breaker. The base bus supporter 9 is configured to protect inner components from high-temperature arc and gas generated from the inside of the molded case circuit breaker at the time of a circuit interruption operation, and formed of an insulating material for insulation between conductors or from the outside.

Inlet portions 9a having a saw tooth shape so as to be engaged with the busbars 2 are formed on a front surface of the base bus supporter 9. The finger assembly 7 of each phase may be exposed between the inlet portions 9a to thus be connected to the busbars 2 of each phase. An upper surface 9b of the base bus supporter 9 protrudes with a length long enough to cover an upper part of the power side terminal portion 1a, and a bottom surface 9c of the base bus supporter 9 is deeply extended to a bottom surface of the molded case circuit breaker 1 so as to form an outlet.

A finger hole 9d for exposing the finger assembly 7 is formed on a front surface of the base bus supporter 9.

Referring to FIG. 2, an arc gas discharge flow (indicated by the arrow) in the plug-in molded case circuit breaker will be explained. An arc generated from the molded case circuit breaker at the time of a circuit interruption operation may directly contact the finger assembly 7.

However, in the case that an arc contacts the finger assembly 7, the finger assembly 7 may be damaged and thus a current flowing path may be destroyed.

SUMMARY OF THE INVENTION

Therefore, an aspect of the detailed description is to provide a molded case circuit breaker capable of protecting a finger assembly from an arc generated at the time of a circuit interruption operation.

To achieve these and other advantages and in accordance with the purpose of this specification, as embodied and broadly described herein, a molded case circuit breaker includes: a power side terminal portion provided at a front side of an enclosure and having a fixed contact arm; a finger assembly coupled to the fixed contact arm, and disposed on a front surface of the power side terminal portion; and a base bus supporter coupled to an upper surface and a lower surface of the power side terminal portion, and having a finger hole through which the finger assembly is exposed. The base bus supporter is provided with a protection unit configured to enclose the finger assembly around the finger hole.

A partition wall for phase-to-phase insulation is provided in the base bus supporter. The protection unit is provided between the partition wall and the partition wall, or between the partition wall and a side wall.

The finger assembly includes a finger formed to have a shape of pincers (tweezers); a finger spring configured to provide a contact pressure to the finger; and a finger holder configured to fix the finger and the finger spring.

The protection unit protrudes backward from a front surface of the base bus supporter.

The protection unit is formed to have a length long enough to overlap an exhaustion cover plate coupled to the power side terminal portion.

An arc exhaustion space is provided between the protection unit and the partition wall.

The protection unit is formed such that its upper and lower surfaces have different lengths from each other.

An interference preventing groove, configured to prevent interference with the connector for connecting the finger assembly to the fixed contact arm, is formed on an upper surface or a lower surface of the protection unit.

A plurality of ribs are formed between the protection unit and the partition wall.

The molded case circuit breaker according to an embodiment of the present invention is provided with the protection unit configured to protect the finger assembly for connecting the fixed contact arm to the busbars. Accordingly, the finger assembly is protected from an arc generated at the time of a circuit interruption operation.

As a result, the molded case circuit breaker may be protected from damage due to an insulation breakdown.

Further, a breakdown of a current flow may be prevented.

DETAILED DESCRIPTION OF THE INVENTION

Description will now be given in detail of preferred embodiments of the present invention, with reference to the accompanying drawings. The description is used to help those skilled in the art to easily embody the present invention, and it should be understood that the technical gist and the scope of the present invention are not limited by the description.

Figure 1:
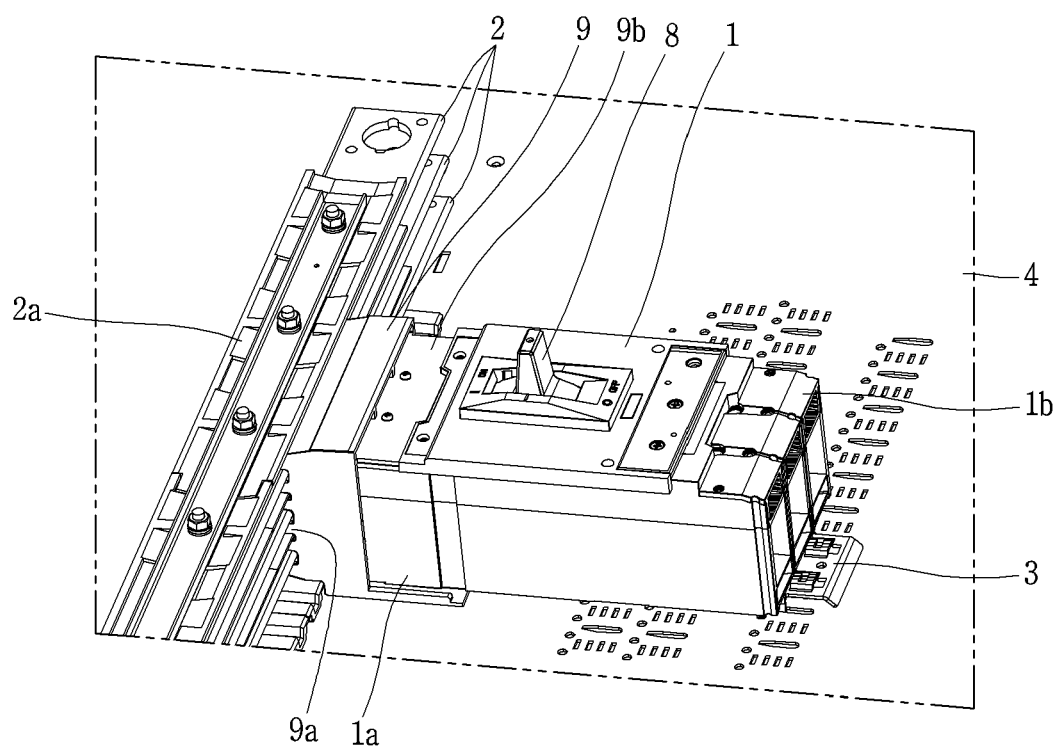
FIG. 1 is a perspective view showing that the conventional molded case circuit breaker is installed at a distribution board.
Figure 2:
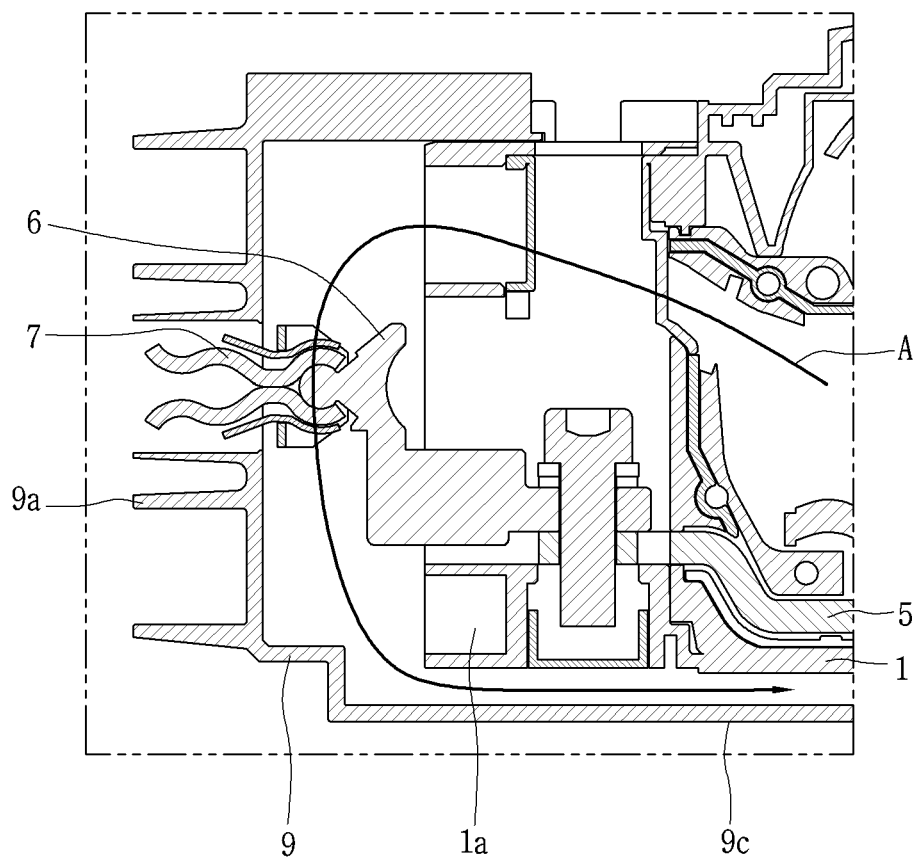
FIG. 2 is a side sectional view of a front side of the molded case circuit breaker of FIG. 1.
Figure 3:
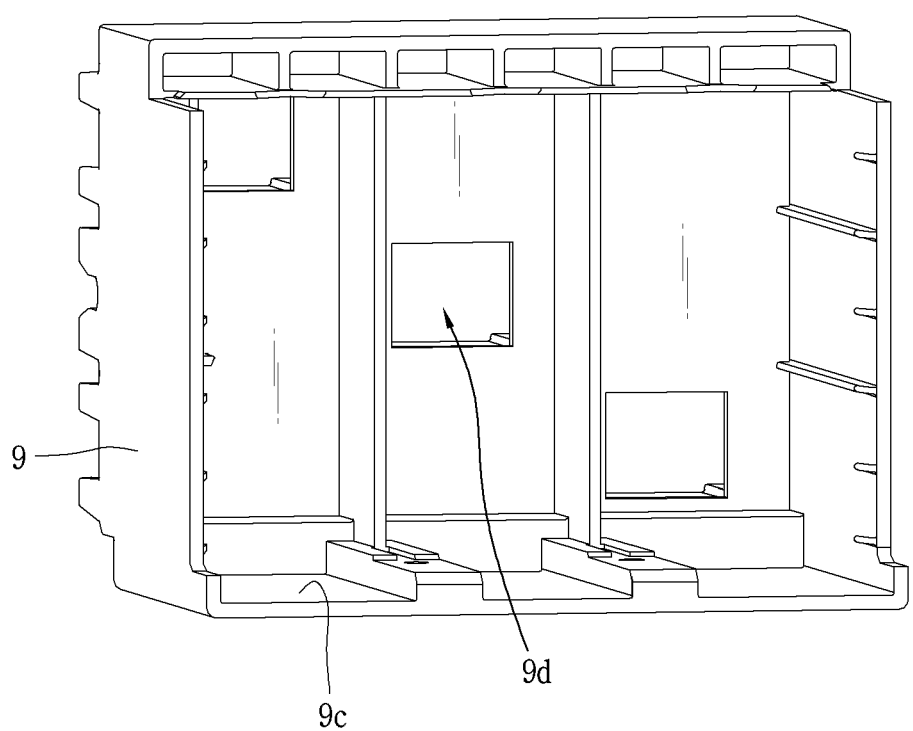
FIG. 3 is a perspective view of a base bus supporter of the molded case circuit breaker of FIG. 1.
Figure 4:
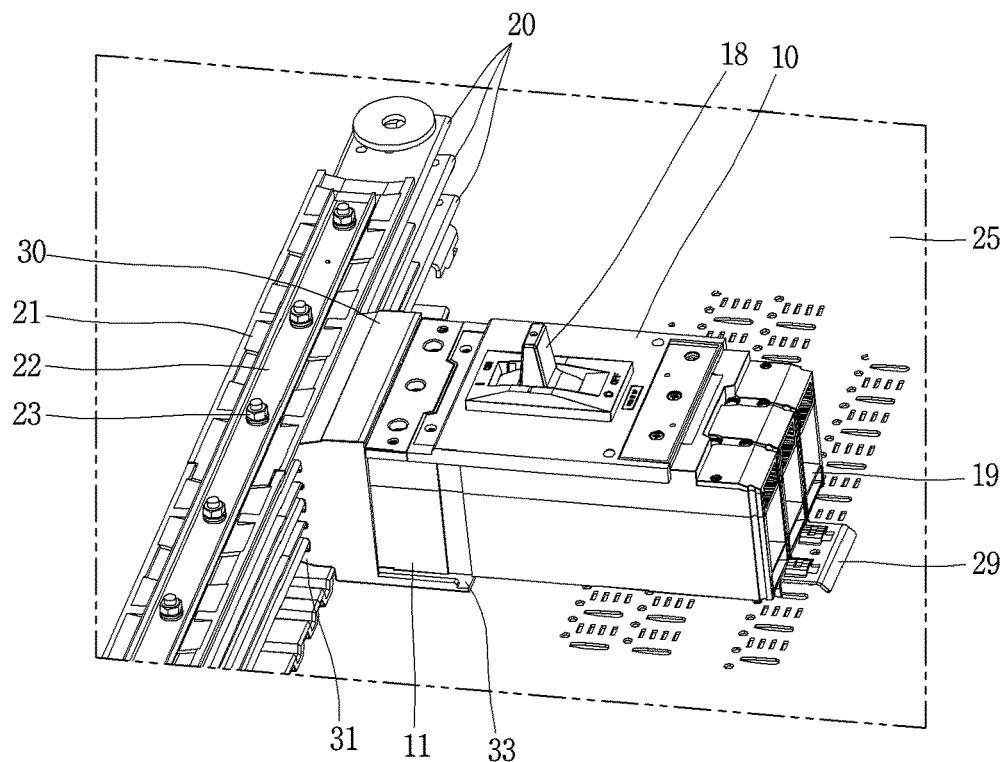
FIG. 4 is a perspective view showing that a molded case circuit breaker according to an embodiment of the present invention is installed at a distribution board.
Figure 5:
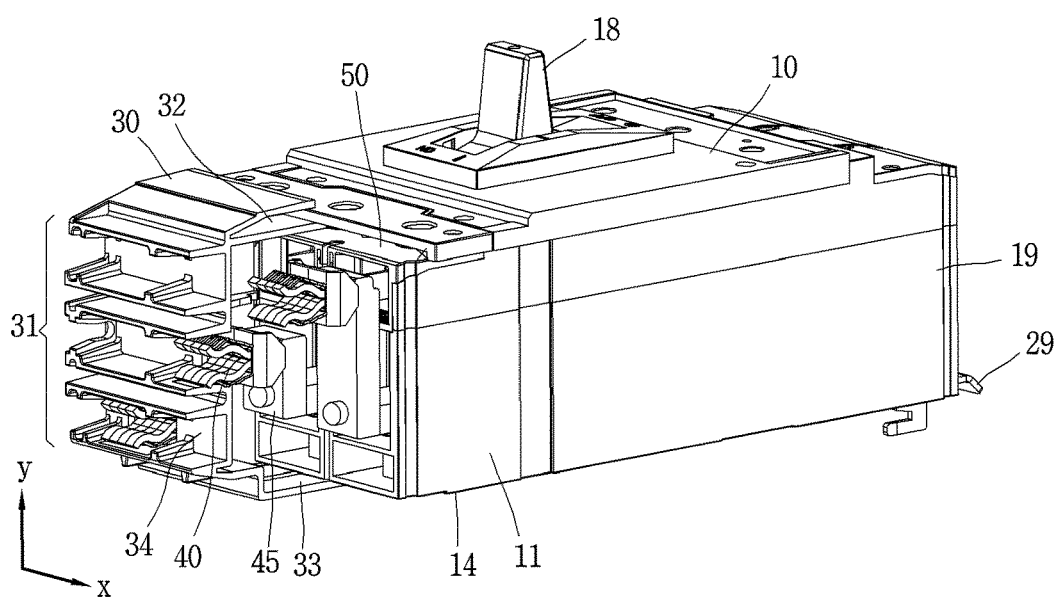
FIG. 5 is a front perspective view of the molded case circuit breaker of FIG. 4, in which a base bus supporter is in a partially cut-out state.
Figure 6:
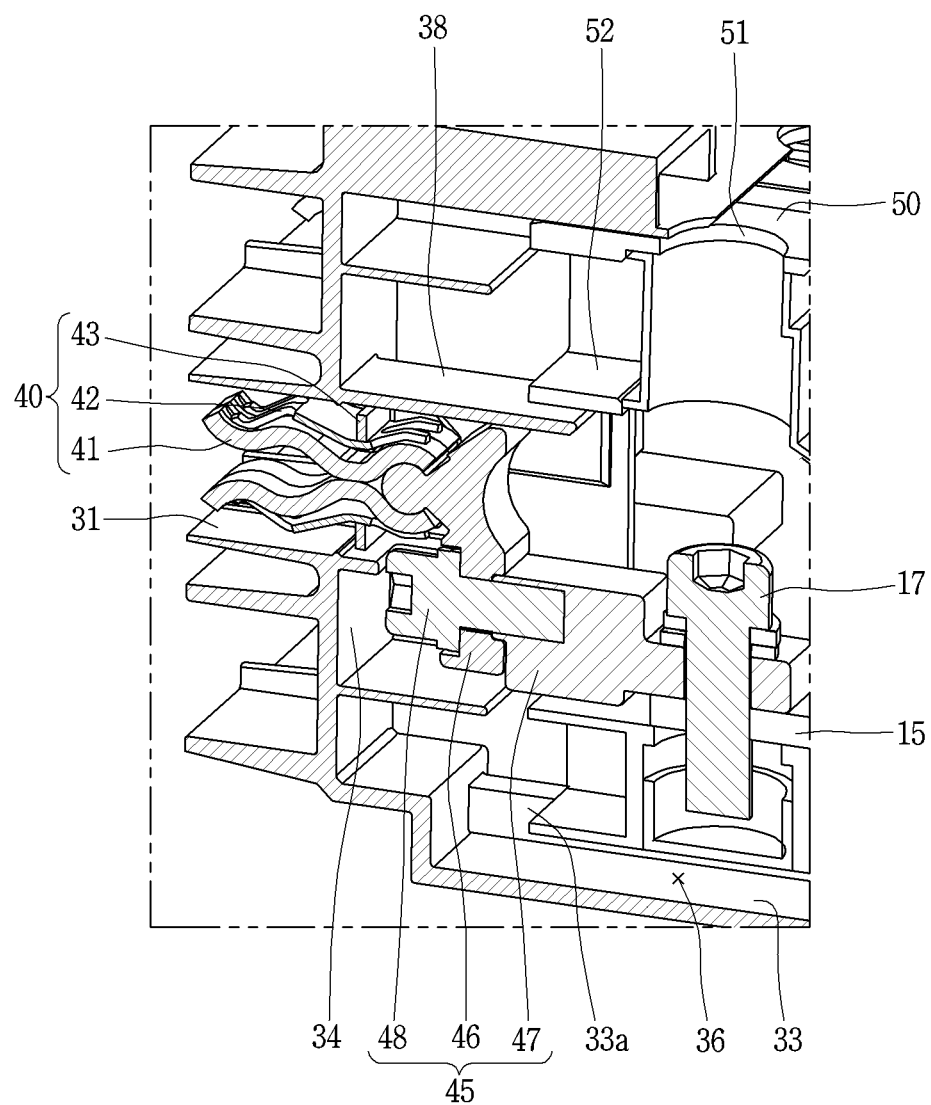
FIG. 6 is a side sectional view of a front side of the molded case circuit breaker of FIG. 4.

FIG. 4 is a perspective view showing that a molded case circuit breaker according to an embodiment of the present invention is installed at a distribution board. FIG. 5 is a front perspective view of the molded case circuit breaker of FIG. 4, in which a base bus supporter is in a partially cut-out state. And FIG. 6 is a side sectional view of a front side of the molded case circuit breaker of FIG. 4. A terminal structure of a molded case circuit breaker according to each embodiment of the present invention will be explained in more detail with reference to the attached drawings.

A molded case circuit breaker according to an embodiment of the present invention includes a power side terminal portion 11 provided at a front side of an enclosure 10 and having a fixed contact arm 15; a finger assembly 40 coupled to the fixed contact arm 15, and disposed on a front surface of the power side terminal portion 11; and a base bus supporter 30 coupled to an upper surface and a lower surface of the power side terminal portion 11, and having a finger hole 35 through which the finger assembly 40 is exposed. The base bus supporter 30 is provided with a protection unit 38 configured to enclose the finger assembly 40 around the finger hole 35.

The enclosure 10 of the molded case circuit breaker is formed to have a box shape of a rectangular parallelepiped, approximately. A handle 18 for manipulating a switching device is provided on the enclosure 10. The handle 18 may rotate to an 'On' position, an 'Off' position and a 'reset' position.

The power side terminal portion 11 connectable to a power line is provided at a front side of the enclosure 10 (the left side in the drawings). And a load side terminal portion 19 connectable to a load is provided at a rear side of the enclosure 10 (the right side in the drawings).

The fixed contact arm 15 is provided in the power side terminal portion 11 (refer to FIG. 6). Although not shown, a movable contact arm contactable to or detachable from the fixed contact arm 15 is provided in the enclosure 10. As the movable contact arm contacts or is separated from the fixed contact arm 15 by operation of the switching device, a circuit connection or a circuit separation is performed.

A plurality of busbars 20 are installed at a distribution board panel 25. In case of a three-phase circuit, 3 busbars 20 may be installed in parallel. Each of the busbars 20 may be installed at the distribution board panel 25 by a busbar mounting member 21 formed of an insulating material, a busbar mounting bracket 22 formed of an insulating material, and a coupling screw 23.

The load side terminal portion 19 of the enclosure 10 is fixed to the distribution board panel 25 by a mounting bracket 29.

A connection member for connecting the fixed contact arm 15 (a power side terminal) to the busbars 20 is provided at the power side terminal portion 11. The connection member may include a connector 45 and the finger assembly 40.

The connector 45 is bent in an 'L' shape when viewed from the side. A lower end of the connector 45 is connected to the fixed contact arm 15, and an upper end thereof is exposed to a front side of the power side terminal portion 11. The finger assembly 40 is coupled to an upper end of the connector 45. The finger assembly 40 may be formed to have a shape of pincers (tweezers) so as to be coupled to the busbars 20. The finger assembly 40 of each phase may be positioned at a different height. For instance, the finger assembly of an R-phase is provided at a position of an uppermost busbar, and the finger assembly of a T-phase is provided at a position of a lowermost busbar.

The finger assembly 40 includes a finger 41 formed to have a shape of pincers (tweezers), a finger spring 42 configured to provide a contact pressure to the finger 41, and a finger holder 43 configured to fix the finger 41 and the finger spring 42 in an enclosing manner.

The finger assembly 40 is exposed to inlet portions 31 which protrude to a front surface of the base bus supporter 30.

The connector 45 is provided. The connector 45 is configured to connect the finger assembly 40 with the fixed contact arm 15. The connector 45 may be formed to have an 'L' shape, approximately. The finger assembly 40 is fixed to an upper part of the connector 45, and the fixed contact arm 15 is fixed to a lower part of the connector 45.

The connector 45 may include a vertical connector 46, a horizontal connector 47, and a coupling member 48 configured to fix the vertical connector 46 and the horizontal connector 47.

The connector 45 may be coupled to the fixed contact arm 15 by a coupling member 17.

Figure 7:
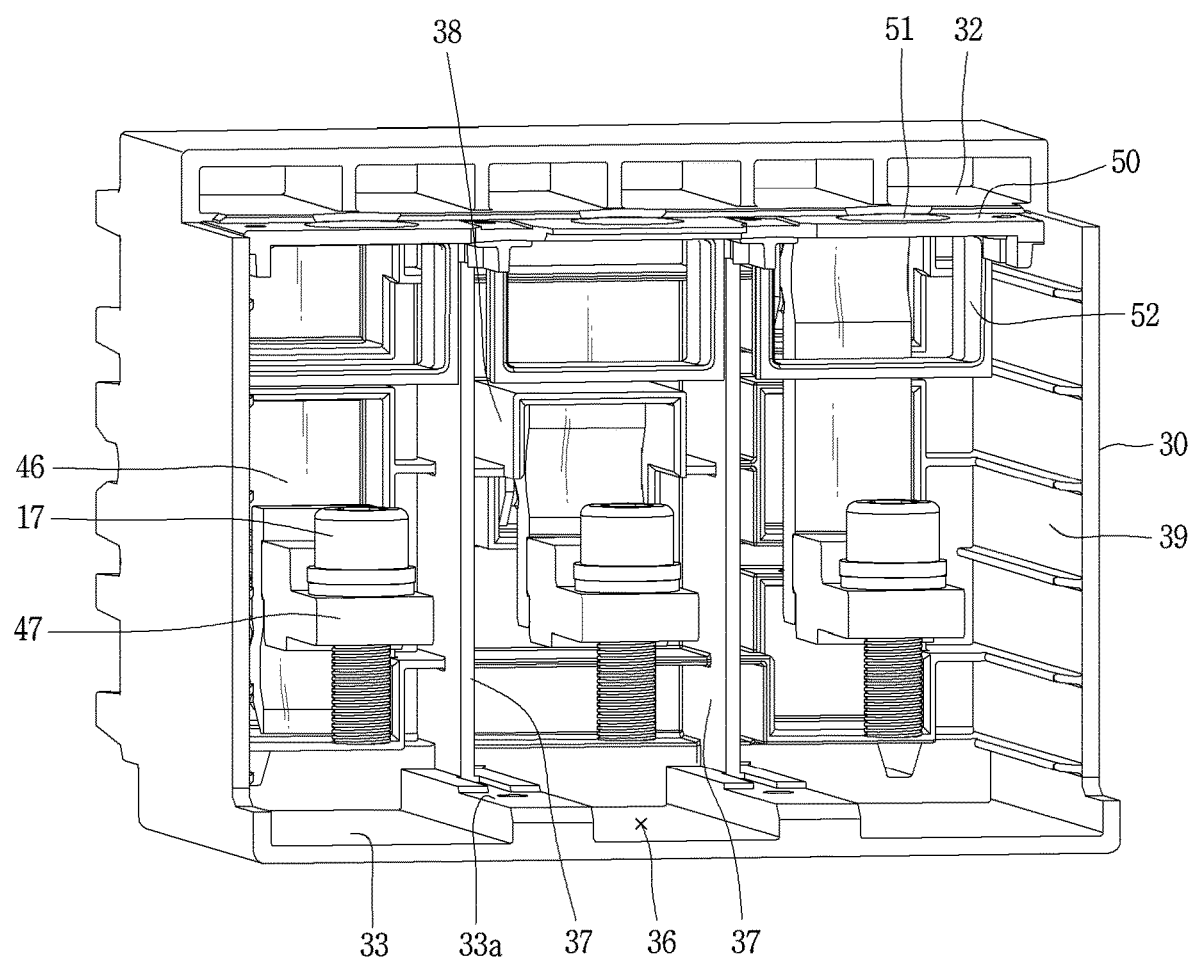
FIG. 7 is a rear perspective view of the base bus supporter of the molded case circuit breaker of FIG. 4.
Figure 8:
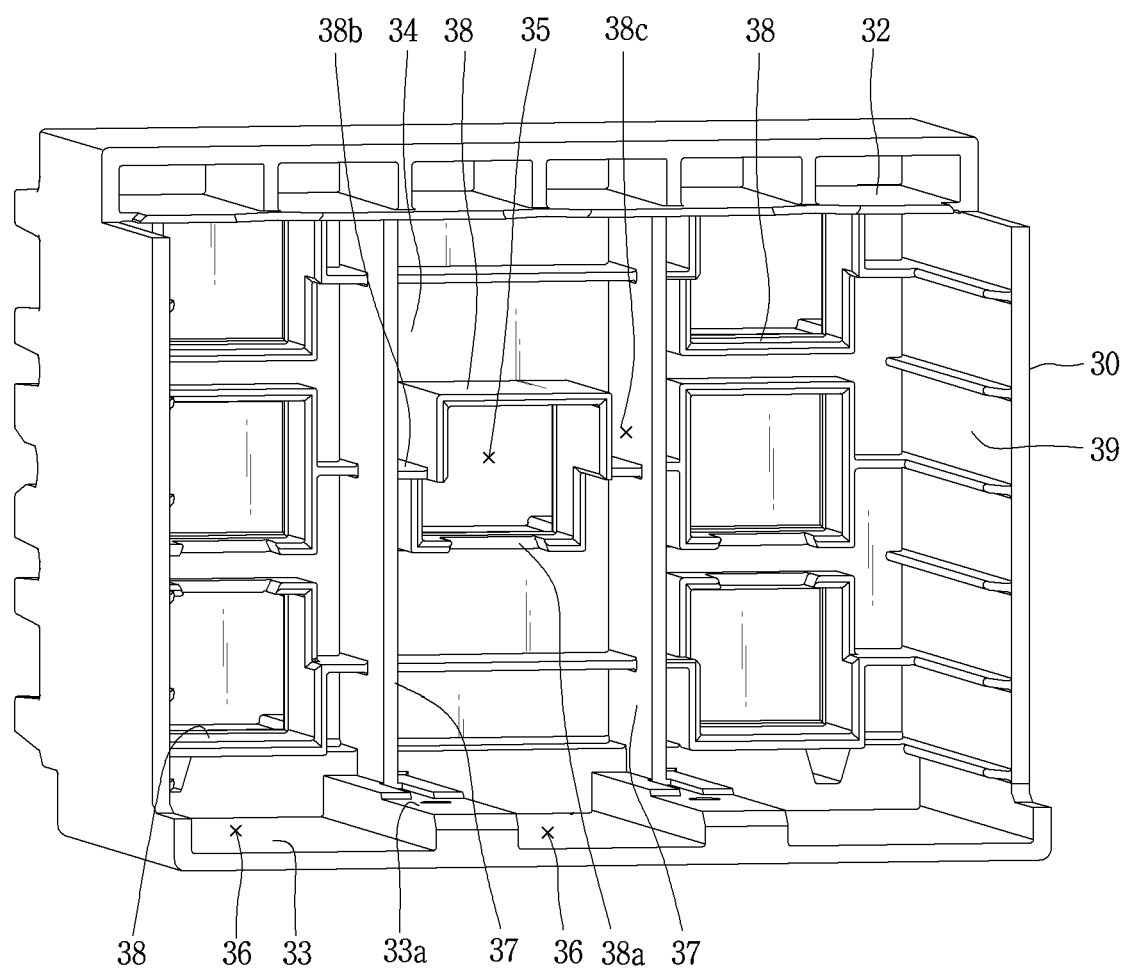
FIG. 8 is a perspective view of the base bus supporter of FIG. 7.

The base bus supporter shown in FIGS. 7 and 8 will be further referred to.

The base bus supporter 30 is provided to protect the connection member between the power side terminal portion 11 and the busbars 20, and to maintain an insulated state from the outside. The base bus supporter 30 is formed of an insulating material.

The base bus supporter 30 is fixed to the power side terminal portion 11, and covers the finger assembly 40 and the connector 45. The base bus supporter 30 may be formed in a shape of a box having an open rear side.

The inlet portion 31 is provided on a front surface 34 of the base bus supporter 30. The inlet portion 31 may be configured in the form of a plurality of teeth when viewed from the side, so as to be inserted between the busbars 20. The teeth may be formed to be engaged with the busbars 20 and the busbar mounting members 21.

The finger hole 35 may be formed at the front surface 34 of the base bus supporter 30, such that the finger assembly 40 may be exposed to the inlet portion 31.

The finger assembly 40 of each phase is arranged at a different horizontal/vertical position. That is, referring to FIG. 5, the finger assembly 40 of each phase may be arranged at a different position on xy planes. For instance, the finger assembly of an R-phase may be arranged on the rightmost side on the x-axis, and on the uppermost end on the y-axis. And the finger assembly of a T-phase may be arranged on the leftmost side on the x-axis, and on the lowermost end on the y-axis.

An upper surface coupling portion 32 coupled to an upper surface (an exhaustion cover plate 50) of the power side terminal portion 11, and a lower surface coupling portion 33 coupled to a lower surface 14 of the power side terminal portion 11 are formed at upper and lower parts of the base bus supporter 30, respectively. The upper surface coupling portion 32 and the lower surface coupling portion 33 may be formed as plates.

The lower surface coupling portion 33 of the base bus supporter 30 long-protrudes backward so as to enclose the lower surface 14 of the power side terminal portion 11. A plurality of ribs 33a may be formed at the lower surface coupling portion 33, thereby forming an exhaustion space 36 of arc gas between the lower surface 14 of the power side terminal portion 11 and the lower surface coupling portion 33. Arc gas generated at the time of a circuit interruption operation is exhausted to the outside through the exhaustion space of arc gas 36. Here, the ribs 33a may be extended from a partition wall 37.

The upper surface coupling portion 32 of the base bus supporter 30 may be formed to be shorter than the lower surface coupling portion 33.

The partition wall 37 for phase-to-phase insulation is provided in the base bus supporter 30. The partition wall 37 may be formed as a vertical wall provided between both side surfaces of the base bus supporter 30. The partition wall 37 may be supported by a plurality of ribs formed nearby.

The protection unit 38 is formed around the finger hole 35 of the base bus supporter 30. The protection unit 38 is provided between the partition wall 37 and the partition wall 37, or between the partition wall 37 and a side wall 39.

The protection unit 38 is provided to enclose the finger assembly 40. The protection unit 38 is formed to have a size large enough to enclose the finger 41, the finger spring 42 and the finger holder 43.

The protection unit 38 protrudes backward from the front surface 34 of the base bus supporter 30. Here, the protection unit 38 is formed to have a length long enough to overlap an exhaustion duct 52 of an exhaustion cover plate 50. Accordingly, arc gas discharged through the exhaustion duct 52 flows to the periphery of the protection unit 38, without contacting the finger assembly 40.

A space is formed near the protection unit 38. An arc exhaustion space 38c is provided between the protection unit 38 and the partition wall 37. Accordingly, arc gas flows to the exhaustion space 36 of arc gas positioned at the lower side, along the arc exhaustion space 38c.

The protection unit 38 may be formed such that its upper and lower surfaces have different lengths from each other.

An interference preventing groove 38a for prevention of interference with the connector 45 may be formed on an upper surface or a lower surface of the protection unit 38.

Ribs 38b for intensity reinforcement may be formed between the protection unit 38 and the partition wall 37.

An exhaustion cover plate 50 is provided. The exhaustion cover plate 50 is coupled to an upper part of the power side terminal portion 11. The exhaustion cover plate 50 is connected to an outlet of an arc chamber (not shown) of the molded case circuit breaker, thereby inducing arc gas.

An assembly hole 51 for coupling the connector 45 with the fixed contact arm 15 is formed on an upper surface of the exhaustion cover plate 50.

The exhaustion duct 52, through which arc gas generated from the outlet of the arc chamber is discharged, is provided on a lower surface of the exhaustion cover plate 50.

The molded case circuit breaker according to an embodiment of the present invention is provided with the protection unit configured to protect the finger assembly for connecting the fixed contact arm to the busbars. Accordingly, the finger assembly is protected from an arc generated at the time of a circuit interruption operation.

As a result, the molded case circuit breaker may be protected from damage due to an insulation breakdown.

Further, a breakdown of a current flow may be prevented.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A molded case circuit breaker, comprising:
    a power side terminal portion provided at a front side of an enclosure, and having a fixed contact arm;
    a finger assembly coupled to the fixed contact arm, and disposed on a front surface of the power side terminal portion; and
    a base bus supporter coupled to an upper surface and a lower surface of the power side terminal portion, and having a finger hole through which the finger assembly is exposed,
    wherein the base bus supporter is provided with a protection unit configured to enclose the finger assembly around the finger hole,
    wherein a partition wall for phase-to-phase insulation is provided in the base bus supporter, and
    wherein the protection unit is provided between the partition wall and a further partition wall, or between the partition wall and a side wall.

2. The molded case circuit breaker of claim 1, wherein the finger assembly includes:
    a finger formed to have a shape of pincers;
    a finger spring configured to provide a contact pressure to the finger; and
    a finger holder configured to fix the finger and the finger spring.

3. The molded case circuit breaker of claim 1, wherein the protection unit protrudes backward from a front surface of the base bus supporter.

4. The molded case circuit breaker of claim 3, wherein the protection unit is formed to have a length long enough to overlap an exhaustion cover plate coupled to the power side terminal portion.

5. The molded case circuit breaker of claim 1, wherein an arc exhaustion space is provided between the protection unit and the partition wall.

6. The molded case circuit breaker of claim 1, wherein the protection unit is formed such that upper and lower surfaces of the protection unit have different lengths from each other.

7. The molded case circuit breaker of claim 1, wherein an interference preventing groove configured to prevent interference with a connector for connecting the finger assembly to the fixed contact arm is formed on an upper surface or a lower surface of the protection unit.

8. The molded case circuit breaker of claim 1, wherein a plurality of ribs are formed between the protection unit and the partition wall.

\* \* \* \* \*